United States Patent
Hebert

(10) Patent No.: US 12,553,550 B2
(45) Date of Patent: Feb. 17, 2026

(54) TENSIONER AND METHOD OF USING SAME

(71) Applicant: SPM Oil & Gas Inc., Fort Worth, TX (US)

(72) Inventor: Christopher Hebert, Alberta (CA)

(73) Assignee: SPM Oil & Gas Inc., Fort Worth, TX (US)

( * ) Notice: Subject to any disclaimer, the term of this patent is extended or adjusted under 35 U.S.C. 154(b) by 954 days.

(21) Appl. No.: 17/526,932

(22) Filed: Nov. 15, 2021

(65) Prior Publication Data

US 2023/0151914 A1    May 18, 2023

(51) Int. Cl.
*F16L 23/024*     (2006.01)
*B25B 29/02*      (2006.01)
*F16L 23/036*     (2006.01)

(52) U.S. Cl.
CPC ............ *F16L 23/024* (2013.01); *B25B 29/02* (2013.01); *F16L 23/036* (2013.01)

(58) Field of Classification Search
CPC ..... F16L 23/024; F16L 23/036; F16L 23/003; B25B 29/02; F16B 31/04; F16B 31/043; B23P 19/067
USPC .... 411/14.5, 915–917, 14; 285/920, 23, 412
See application file for complete search history.

(56) References Cited

U.S. PATENT DOCUMENTS

| | | | | |
|---|---|---|---|---|
| 3,162,071 A | * | 12/1964 | Biach | B25B 29/02 81/57.38 |
| 3,494,592 A | * | 2/1970 | Schumann | B25B 29/02 254/29 A |
| 3,645,563 A | * | 2/1972 | Rochelle | F16L 23/162 285/317 |
| 4,075,923 A | * | 2/1978 | Latham | F16B 31/043 411/548 |
| 4,150,477 A | * | 4/1979 | Orr | B25B 27/16 29/525.08 |
| 4,281,580 A | * | 8/1981 | Bunyan | B25B 29/02 411/548 |
| 4,338,037 A | * | 7/1982 | Deminski | F16C 5/00 403/24 |

(Continued)

FOREIGN PATENT DOCUMENTS

| | | | | |
|---|---|---|---|---|
| CN | 204983678 U | | 1/2016 | |
| DE | 2804313 A | * | 8/1978 | ............. B25B 29/02 |

OTHER PUBLICATIONS

Hydraulic Twin-Cylinder High-Strength Bolt Tensioning Tensioning Method Fastening Technology (2 pages).
Hydraulic Bolt Tensioning Cylinder Type Twin (1 page).

*Primary Examiner* — Christine M Mills
*Assistant Examiner* — Dil K. Magar

(57) ABSTRACT

A tensioner may assist in coupling two pipe flanges. The tensioner may include a body and a piston. The body may include a central longitudinal axis, a pair of fastener holes extending through the body in a direction parallel to the central longitudinal axis, and a piston housing having an inner bore disposed about the central longitudinal axis. The piston housing may be provided between the pair of fastener holes. An axial end of the piston housing may define a distal end of the body. The piston may be at least partially disposed in the inner bore of the piston housing. The piston may be axially moveable parallel to the central longitudinal axis through an opening of the inner bore at the distal end of the body.

19 Claims, 10 Drawing Sheets

(56) References Cited

U.S. PATENT DOCUMENTS

| | | | | |
|---|---|---|---|---|
| 4,659,065 | A * | 4/1987 | Simms | B25B 29/02 81/57.38 |
| 5,083,889 | A * | 1/1992 | Steinbock | F16B 31/04 411/917 |
| 5,468,106 | A * | 11/1995 | Percival-Smith | B25B 29/02 411/917 |
| 5,505,465 | A * | 4/1996 | Hornsby | F16J 15/3464 277/374 |
| 6,112,396 | A * | 9/2000 | Steinbock | F16B 31/04 411/917 |
| 6,263,764 | B1 * | 7/2001 | Steinbock | F16B 31/04 81/57.38 |
| 6,312,018 | B1 * | 11/2001 | Martin | B21D 39/10 29/523 |
| 7,275,462 | B2 * | 10/2007 | Faus | B23P 19/067 81/57.38 |
| 8,277,206 | B2 * | 10/2012 | Raghavan | F04B 53/007 417/454 |
| 8,950,292 | B2 * | 2/2015 | Declerck | B23P 19/067 81/10 |
| 9,009,945 | B2 * | 4/2015 | Travis | F16L 23/024 29/525.01 |
| 9,976,928 | B2 * | 5/2018 | Strait | E21B 1/00 |
| 10,252,405 | B2 * | 4/2019 | Bartels | F16B 31/04 |
| 2004/0036293 | A1 * | 2/2004 | Flindall | F16L 23/036 285/412 |
| 2005/0165397 | A1 * | 7/2005 | Faus | B25B 29/02 81/57.38 |
| 2008/0006122 | A1 * | 1/2008 | Hohmann | B23P 19/067 81/57.38 |
| 2008/0264493 | A1 * | 10/2008 | Raghavan | F04B 53/007 137/15.01 |
| 2010/0000375 | A1 * | 1/2010 | Steinbock | B23P 19/067 81/57.38 |
| 2011/0188960 | A1 * | 8/2011 | Hohmann | F16B 31/043 411/14.5 |
| 2011/0308815 | A1 * | 12/2011 | Kotrla | E21B 33/038 166/85.4 |
| 2014/0174262 | A1 * | 6/2014 | Hohmann | B25B 29/02 81/57.38 |
| 2014/0348610 | A1 * | 11/2014 | Davis | F16B 5/025 411/214 |
| 2015/0030385 | A1 * | 1/2015 | Bucknell | F16B 7/02 403/337 |
| 2015/0314431 | A1 * | 11/2015 | Hohmann | B23P 19/067 81/57.38 |
| 2016/0169385 | A1 * | 6/2016 | Patterson | F04B 53/16 92/169.1 |
| 2016/0271775 | A1 * | 9/2016 | Hohmann | B25B 29/02 |
| 2017/0146425 | A1 * | 5/2017 | Strait | E21B 1/00 |
| 2017/0211734 | A1 * | 7/2017 | Kawanishi | F16L 23/036 |
| 2017/0334048 | A1 * | 11/2017 | Bartels | B25B 29/02 |
| 2019/0193216 | A1 * | 6/2019 | Møller | F16B 39/12 |
| 2021/0199143 | A1 * | 7/2021 | Schneider | F16B 31/04 |

* cited by examiner

TENSIONER AND METHOD OF USING SAME

TECHNICAL FIELD

The present disclosure relates generally to tensioners, and more particularly, to hydraulic stud or bolt tensioners and methods of using the same.

BACKGROUND

Studs or bolts may be used with nuts to couple two or more structures (e.g., pipe flanges) together. To secure a coupling, the structures may need to be urged together and the studs or bolts tensioned or stretched (i.e., "preloaded") before securing nuts are tightened to properly secure the structures. Stud or bolt tensioners may be used to urge structures together and stretch the studs or bolts. Once the stud tensioners are activated, securing nuts may be tightened to properly secure the structures, and the tensioners may be removed from the structures.

Existing tensioners may be overly complex, require specialized tools, and may be limited to sizes according to studs or bolts, which increases time spent during a tightening process. To tighten multiple studs or bolts, each stud or bolt may require its own tensioner.

U.S. Pat. No. 9,009,945, issued on Apr. 21, 2015, describes a hydraulic flange connector having a piston with a first end engaged with a first stud and a second end acting as and/or engaged with a second stud. As the piston is extended due to hydraulic fluid, the first and second studs are urged to connect two flanges. The hydraulic connector is not removed, and thus forms a permanent part of the coupling. One hydraulic connector is required for each circumferential position along the flange.

The tensioner of the present disclosure may solve one or more of the problems set forth above and/or other problems in the art. The scope of the current disclosure, however, is defined by the attached claims, and not by the ability to solve any specific problem.

SUMMARY

In one aspect, a tensioner may assist in coupling two pipe flanges. The tensioner may include a body and a piston. The body may include a central longitudinal axis, a pair of fastener holes extending through the body in a direction parallel to the central longitudinal axis, and a piston housing having an inner bore disposed about the central longitudinal axis. The piston housing may be provided between the pair of fastener holes. An axial end of the piston housing may define a distal end of the body. The piston may be at least partially disposed in the inner bore of the piston housing. The piston may be axially moveable parallel to the central longitudinal axis through an opening of the inner bore at the distal end of the body.

In another aspect, a coupling system may couple a pair of pipe flanges using a plurality of fasteners. The coupling system may include a plurality of tensioners. Each tensioner may include a body and a piston. The body may include a proximal end, a distal end, and a central longitudinal axis extending from the proximal end to the distal end. The body may include a pair of fastener holes extending through the body in a direction parallel to the central longitudinal axis. The body may include a piston housing provided between the pair of fastener holes. The piston may be at least partially located in the piston housing and extendable distally from the body to exert a force to couple the pipe flanges.

In another aspect, a method of tensioning first and second pipe flanges with a plurality of tensioners may include inserting each tensioner of the plurality of tensioners onto at least two fasteners of a plurality of fasteners. A first nut of each fastener may be disposed between the first pipe flange and a corresponding tensioner. The method may include coupling a second nut onto each fastener. Each tensioner may be disposed between the first and second nuts of each corresponding fastener. The method may include tightening the second nut of each fastener against a proximal end surface of each corresponding tensioner, urging a piston of each tensioner against the first pipe flange to move the first and second pipe flanges from a first axial spacing to a second axial spacing relatively closer together than the first axial spacing, tightening the first nut of each fastener against the first pipe flange to maintain the second axial spacing between the first and second pipe flanges, and removing each tensioner from the corresponding fasteners.

BRIEF DESCRIPTION OF THE DRAWINGS

The accompanying drawings, which are incorporated in and constitute a part of this specification, illustrate various exemplary embodiments and together with the description, serve to explain the principles of the disclosed systems and methods.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
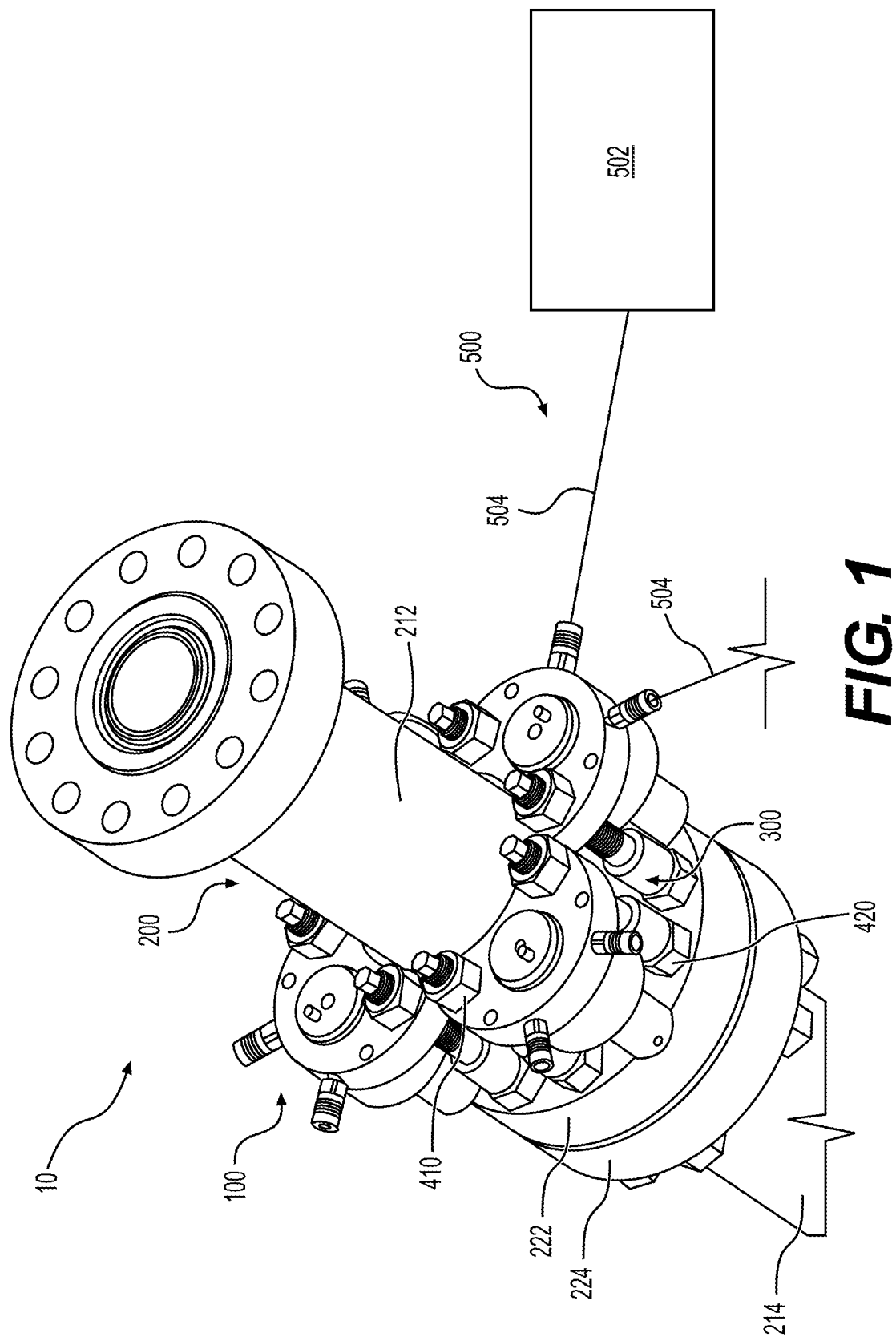
FIG. 1 is a perspective view of a pipe system and a plurality of tensioners applied to the pipe system according to aspects of the disclosure.
Figure 2:
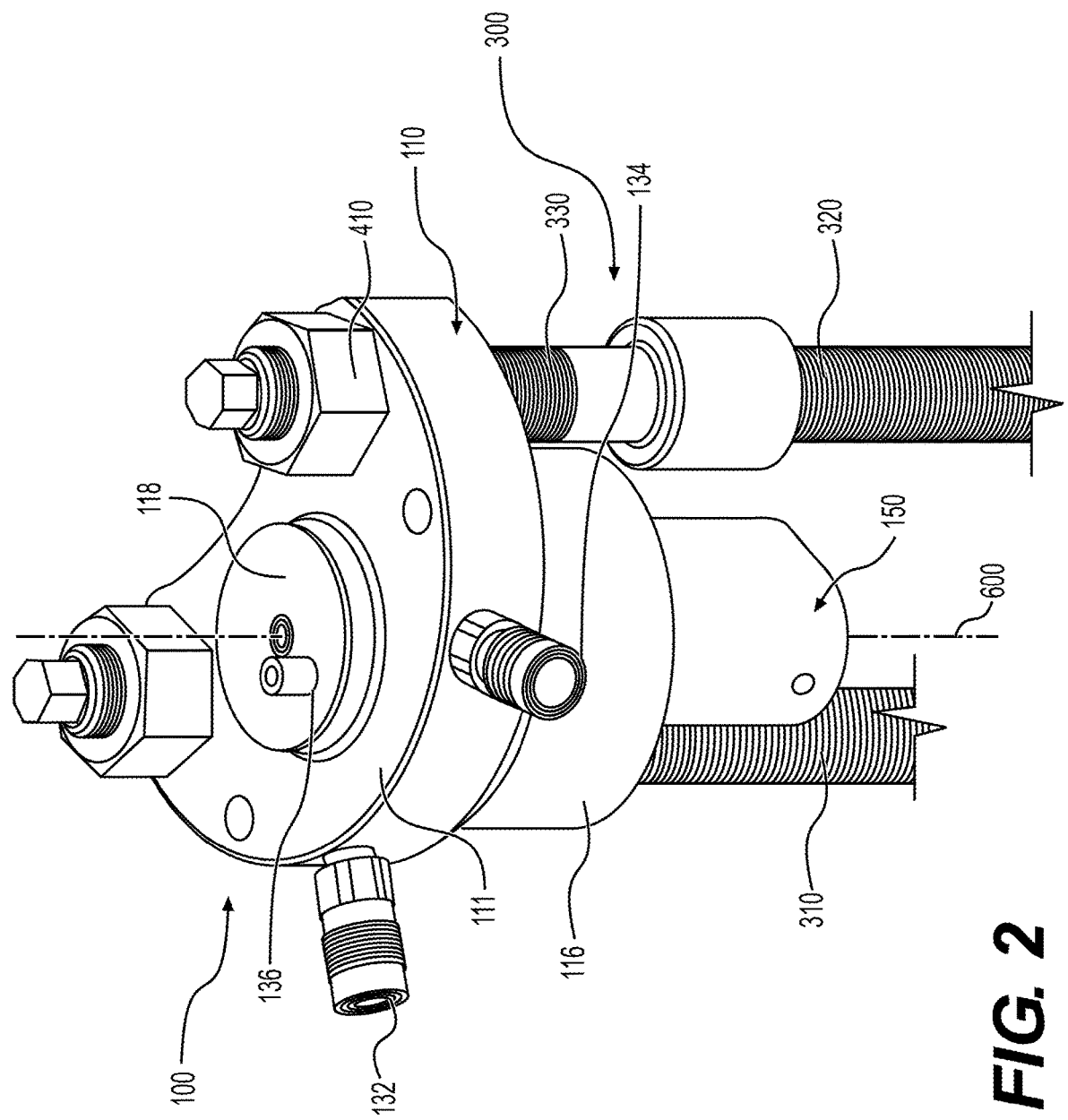
FIG. 2 is a perspective view of two tensioner studs and a tensioner of FIG. 1.

FIG. 1 illustrates a coupling system 10 including a plurality of tensioners 100 applied to a pipe system 200. FIG. 2 illustrates a perspective view of a portion of the coupling system 10 with the pipe system removed for clarity. Referring to FIGS. 1-2, the pipe system 200 may include a first or upper pipe 212 having a first or upper pipe flange 222 and a second or lower pipe 214 having a second or lower pipe flange 224. The first and second pipe flanges 222 and 224 may include a plurality of fastener holes through which studs or bolts 300 extend to couple the first and second pipe flanges 222 and 224. Two or more fasteners (e.g., studs or bolts 300) may also extend through tensioner 100 and may be secured via a plurality of nuts 410, 420, and 430. It is contemplated that tensioner 100 may be used to assist the coupling of any two components, such as pipe flanges 222, 224, two or more plates, or any other components that are coupled together by elongated fasteners. Also, while tensioner 100 may be used with any appropriate fastener, such as studs, bolts, etc., the use of stud assemblies 300 will be referenced hereinafter for ease of reference. Details of the stud assemblies 300 will be described in more detail with reference to FIGS. 6-7.

The pipe system 200 may include American Petroleum Institute (API) and/or American Society of Mechanical Engineers (ASME) compliant materials, but systems and methods disclosed herein are not limited. The first and second pipes 212 and 214 and the first and second pipe flanges 222 and 224 may be made of a metal material, such as a carbon steel material (e.g., 1018 and/or 1020) or a stainless steel material (e.g., SS315 up to SS410). The first and second pipe flanges 222 and 224 may be designed for 8 studs, 12 studs, 16 studs, etc. As an example, the first and second pipe flanges 222 and 224 may be API 6A 5⅛", 15000 pounds per square inch (psi) flanges and/or 7 1/16", 15000 psi flanges, but aspects disclosed herein are not limited to a particular size or pressure capability of flanges.

The tensioner 100 may be connected to a hydraulic fluid supply system 500 for supplying and draining hydraulic fluid from tensioners 100. The hydraulic fluid supply system 500 may include a pump 502, and hydraulic tubing or hoses 504 to supply and drain fluid to and from each of the tensioners 100. The hydraulic tubing 504 may be made of steel, braided wire, or a flexible or elastomeric material (e.g., rubber, thermoplastic, or polytetrafluoroethylene), but aspects disclosed herein are not so limited. Further, the pump 502 may be a hand pump or a powered pump.

Figure 3:
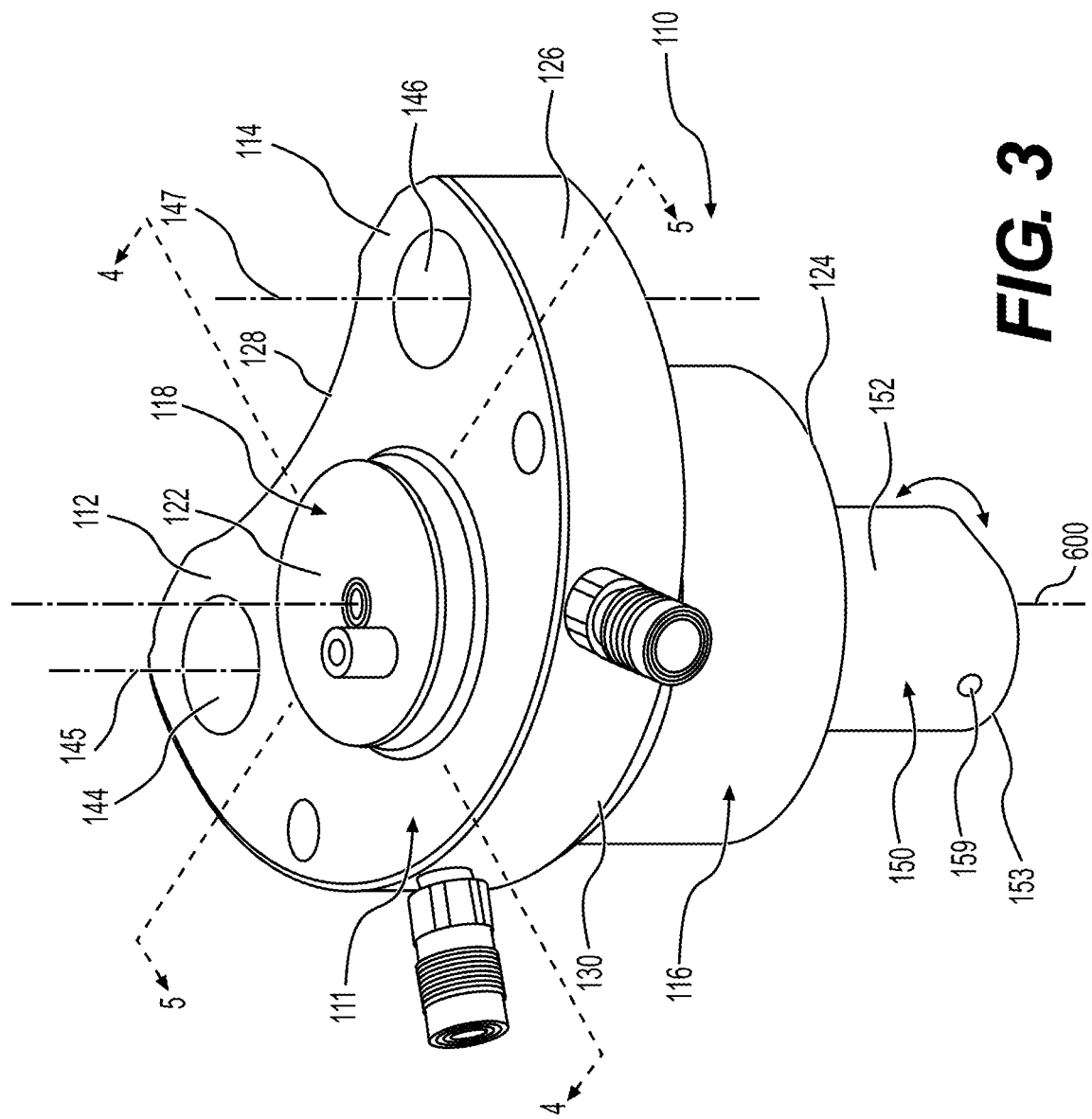
FIG. 3 is a perspective view of the tensioner of FIG. 2 without the tensioner studs.
Figure 4:
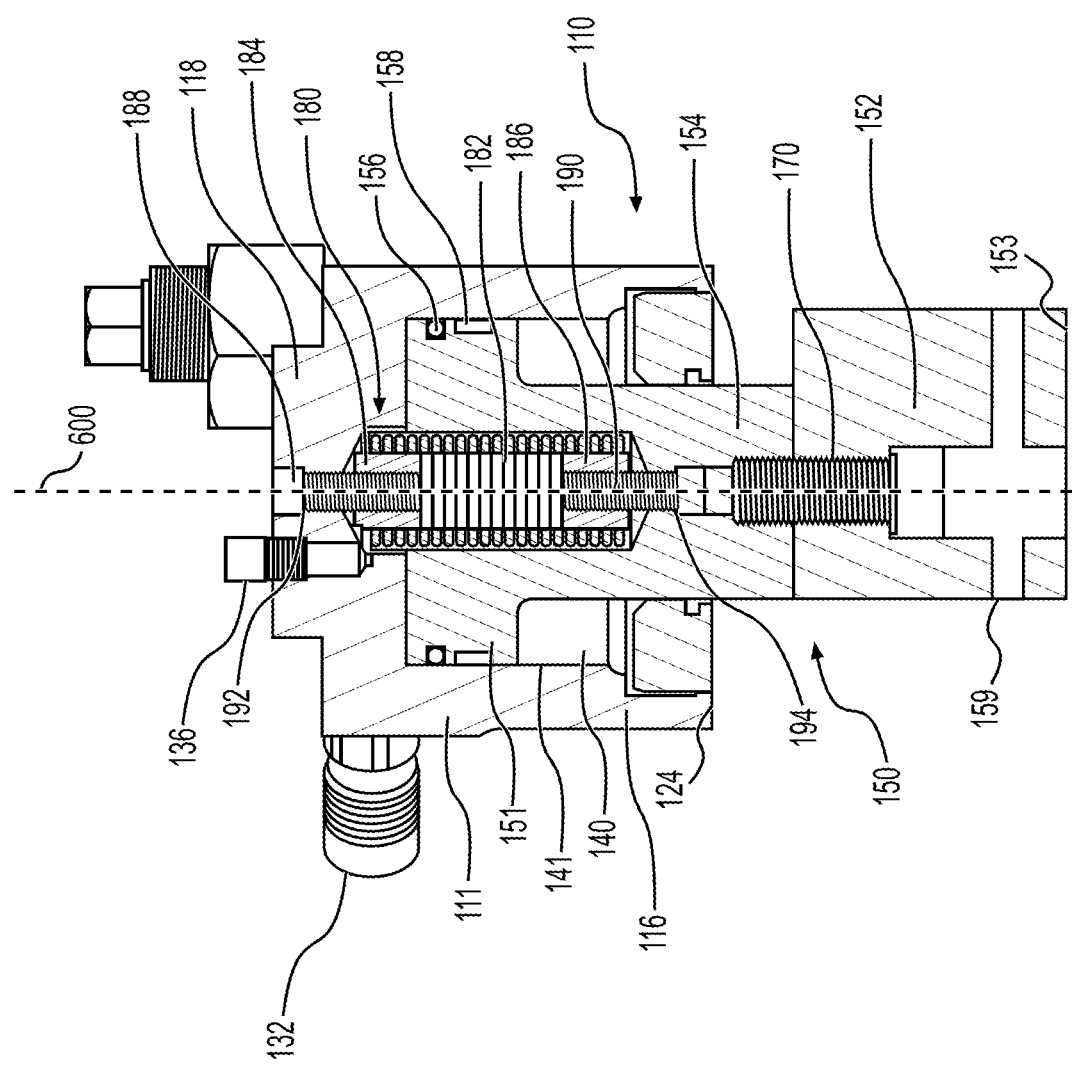
FIG. 4 is a cross-sectional view the tensioner of FIG. 2 along lines 4-4 of FIGS. 3 and 6 with a piston in a first position.
Figure 5:
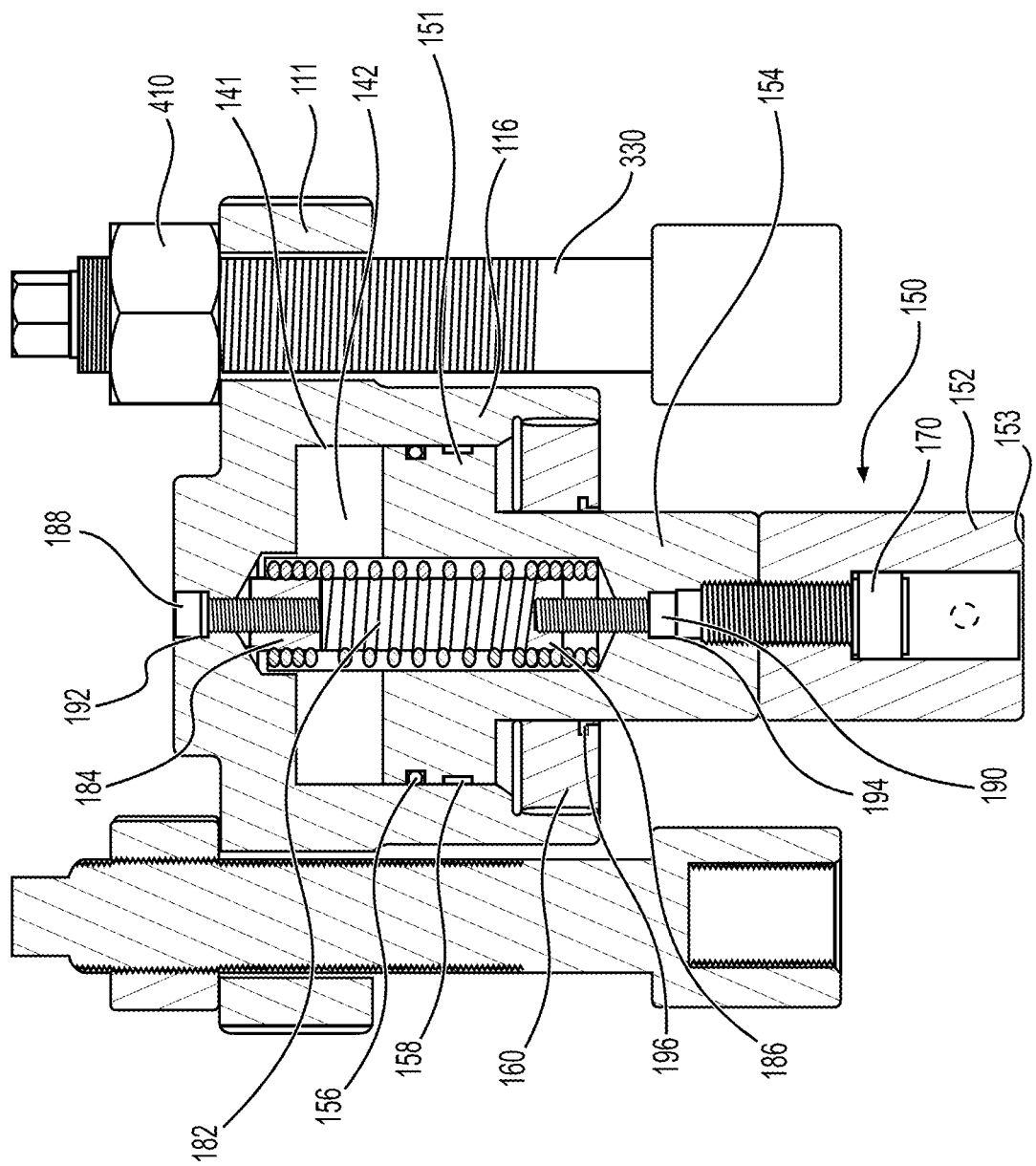
FIG. 5 is a cross-sectional view of the tensioner along lines 5-5 of FIGS. 3 and 6 with a piston in a second position.

Referring to FIGS. 2-3, the tensioner 100 may include a body 110 and a piston 150 moveable within the body 110. The body 110 may be made of a rigid material (e.g., metal such as steel). The body 110 may have a flange or collar 111, a piston housing or cylinder 116 generally disposed on a central axis 600 and extending below the flange 111, an extension or upper casing 118, a proximal or upper end 122, and a distal or lower end 124. Each of the proximal end 122 and distal end 124 may be parallel to each other, as shown. The distal end 124 may form a distal planar surface. The central axis 600 may extend from the proximal end 122 to the distal end 124 of the body 110, and may alternatively be referred to as a central longitudinal axis. Line 4-4 indicates arrows pointing in a left direction to indicate a direction in which the cross-section of FIG. 4 is viewed. Line 5-5 indicates arrows pointing in a forward direction to indicate a direction in which the cross-section of FIG. 5 is viewed.

The flange 111 may have a pair of sides or wings 112, 114 generally extending perpendicular to the central axis 600, a pair of fastener holes 144 and 146 (e.g., stud or bolt holes), a continuous side surface 126, and a pair of couplers or fittings 132 and 134. The pair of sides 112, 114 may include a first side 112 and a second side 114. The first side 112 may extend from a first side (e.g., left side in FIG. 3) of the extension 118, and the second side 114 may extend from a second side (e.g., right side in FIG. 3) of the extension 118. The first and second sides 112 and 114 may extend, with respect to a radial direction of the central axis 600, beyond an outer surface of the piston housing 116. The first and second sides 112 and 114 may have a symmetrical arrangement (e.g. mirror images) about the central axis 600.

The pair of fastener holes 144 and 146 may include a first fastener hole 144 and a second fastener hole 146. The first fastener hole 144 may be provided in the first side 112 at a position radially outside of the piston housing 116 with respect to the central axis 600. The second fastener hole 146 may be provided in the second side 114 at a position radially outside of and non-overlapping with the piston housing 116 with respect to the central axis 600. The first and second fastener holes 144 and 146 may have a symmetrical arrangement (e.g. mirror images) about the central axis 600. The first and second fastener holes 144, 146 may extend through the respective first and second sides 112, 114 in a direction parallel to the central axis 600. The first and second fastener holes 144, 146 may have center axes 145 and 147, respectively, which are parallel to the central axis 600.

The first and second fastener holes 144 and 146 may be configured to receive fasteners 300 (e.g., stud assemblies) therethrough. For convenience of description, the fasteners 300 will be described as stud assemblies 300. Each stud assembly 300 may include a tensioner stud 330, and the first and second fastener holes 144 and 146 may be configured to receive a pair of tensioner studs 330, respectively. The pair of tensioner studs 330 may be configured to be coupled to a pair of studs 310 and 320, respectively, such that each stud assembly 300 includes one stud 310 or 320 and one tensioner stud 330. The stud assembly 300 will be described in more detail with reference to FIG. 6. As an alternative to the stud assembly 300 shown in FIG. 6, the first and second fastener holes 144 and 146 may be configured to receive the pair of studs 310 and 320, which may extend through the tensioner 100, and the tensioner stud 330 may be omitted.

The continuous side surface 126 may be perpendicular to each of the proximal end 122 and distal end 124 (e.g., parallel to the central axis 600). The continuous side surface 126 may have a shape based on the pipe system 200. For example, the continuous side surface 126 may have a first or rear portion 128 for positioning adjacent pipe system 200, and a second or front portion 130 located away from pipe system 200. The rear portion 128 may have a concave curvature with respect to the central axis 600, while the front portion 130 may have a convex curvature with respect to the central axis 600. The continuous side surface 126 will be described in more detail with reference to FIG. 5.

The pair of fittings 132, 134 may be provided at the front portion 130 of the continuous side surface 126. The pair of fittings 132, 134 may include a first coupler or fitting 132 (e.g., inlet coupler) and a second coupler or fitting 134 (e.g., outlet coupler). The first fitting 132 and the second fitting 134 may be configured to receive the hydraulic tubing 504 of the hydraulic fluid supply system 500 (FIG. 1) and may alternatively be referred to as first and second hydraulic fittings. The first and second fittings 132 and 134 may each have internal shut off valves configured to stop or reduce a flow of fluid when the hydraulic tubing 504 is disconnected.

The first and second fittings 132 and 134 may be positioned closer to the proximal end 122 of the body 110 than the distal end 124. The first fitting 132 and the second fitting 134 may be disposed perpendicular to the central axis 600. The first fitting 132 and second fitting 134 may be aligned at a same axial height along the central axis 600, in other words being spaced an equal distance from a bottom of the continuous side surface 126. Positions of the first and second fittings 132 and 134 may be positioned on the front portion 130 of the body 110, which may face away from the pipe system 200 for convenience. Details of a shape of the body 110 will be described in more detail with reference to FIG. 5. The first and second fittings 132 and 134 may protrude from the front side of the extension 118 at circumferential positions, with respect to central axis 600, that are offset from a front center position that is aligned, in a front-rear direction, with the central axis 600.

The piston housing 116 may be provided under the flange 111 at a central position so as to align with the central axis 600. The piston housing 116 may be positioned between the first and second fastener holes 144 and 146 with respect to a lateral direction extending perpendicular to the central axis 600 (e.g., in a direction parallel to line 5-5 of FIG. 6). The piston housing 116 may have a cylindrical shape, but aspects disclosed herein are not limited. The body 110 may have an inner bore 140 (FIG. 4) configured to receive the piston 150. The inner bore 140 may extend through the piston housing 116, the flange 111, and the extension 118. An axial end of the piston housing 116 may define the distal end 124 of the body 110, which may have a flat planar surface, but aspects disclosed herein are not limited. The distal end 124 may include an opening of the inner bore 140.

The extension 118 may extend in a direction parallel to the central axis 600 from the flange 111 at a central position between the first side 112 and the second side 114. The extension 118 may define the proximal end 122 of the body 110. An outer surface of the extension 118 may have a cylindrical shape, and the extension 118 may alternatively be referred to as a cylindrical extension or portion. The extension 118 may include a bleeder or valve 136.

The bleeder 136 may be disposed at the proximal end 122 of the body 110. The bleeder 136 may be configured to exhaust air or gas from inside the body 110. The bleeder 136 may, for example, be positioned on the proximal end 122 of the body 110 in front of (or alternatively, behind or along) the central axis 600 to be closer to a front side of the extension 118. Systems and methods disclosed herein, however, are not limited to the illustrated positions of the first fitting 132, the second fitting 134, and the bleeder 136.

The piston 150 may be axially moveable through the opening of the inner bore 140 (FIG. 4) in a direction parallel to the central axis 600 and extend beyond the distal planar surface at the distal end 124 of the body 110. A saddle 152 of the piston 150 may also be configured to rotate. The saddle 152 will be described in more detail with reference to FIG. 4.

The piston 150 may be coaxially aligned with an inner bore 140 of the body 110 along the central axis 600. The piston 150 may be at least partially disposed in the piston housing 116. As shown in FIG. 3, the piston 150 may extend to an outside of the piston housing 116 and beyond the distal end 124 defined by the bottom surface of the piston housing 116. The piston 150 may be made of rigid material such as metal (e.g., stainless steel or carbon steel). The piston 150 may have a cylindrical shape with a flat bottom surface 153 at a bottom of the saddle 152, but aspects disclosed herein are not so limited.

The bottom surface 153 may have an oval shape or otherwise have a length different from a width. The piston saddle 152 may include a side access tool hole 159 to allow rotation. A tool (e.g., screwdriver) may be inserted into the tool hole 159 so that the user may rotate the piston saddle 152 from a side of the piston 150 (e.g. after mounting on pipe system 200), and achieve more leverage than rotating the piston 150 with fingers. The piston saddle 152 may be rotated to control an orientation of the bottom surface 153 and to control an area of contact or a bearing load area between the bottom surface 153 and the first pipe flange 222 (FIG. 1). In some applications, the bearing load area defined between the bottom surface 153 and the first pipe flange 222 may be subjected to hundreds, thousands, tens of thousands, or even hundreds of thousands pounds of force. A larger bearing load area may assist in an application of force in a coupling system 10 that may use less stud assemblies 300. A size of the bottom surface 153 may be configured such that, in some applications, a portion of the bottom surface 153 extends beyond an edge of the first flange 222 (FIG. 1) upon contact.

Figure 6:
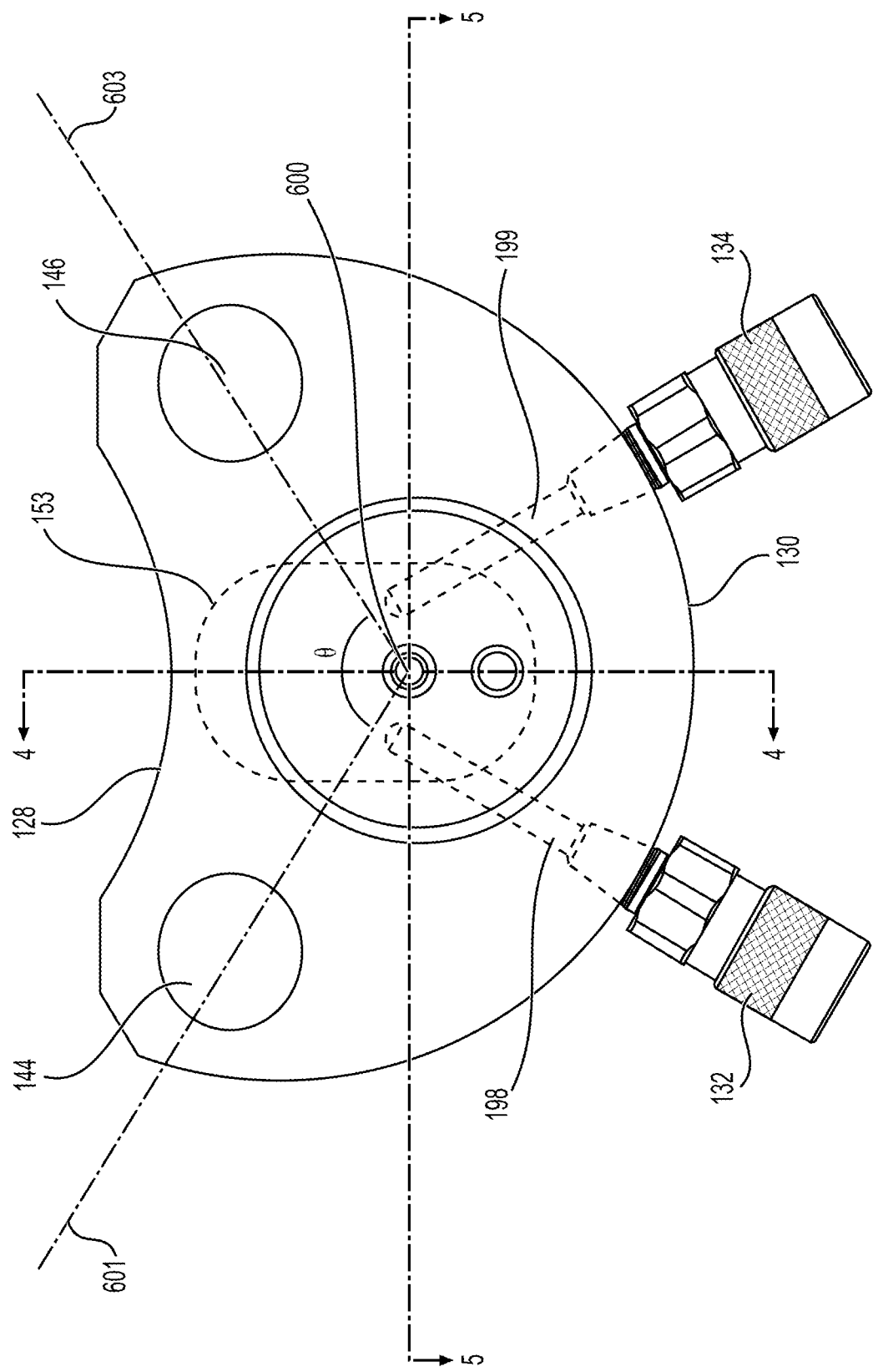
FIG. 6 is a top view of the tensioner of FIG. 2.

FIG. 4 shows an interior of the tensioner 100 along lines 4-4 of FIG. 3 and FIG. 6. FIG. 5 shows the interior of the tensioner 100 along lines 5-5 of FIG. 3 and FIG. 6. FIG. 4 shows the piston 150 in a first position, while FIG. 5 shows the piston 150 in a second position. Referring to FIGS. 4-5, the inner bore 140 may have an inner radial surface 141. The inner bore 140 may be configured to receive the piston 150 and a spring assembly 180 coupling the piston 150 to the piston housing 116. The inner bore 140 may have a shape corresponding to an overall shape of at least a portion of the piston 150 (e.g., cylindrical) with inner dimensions (e.g., a diameter) corresponding to the outer dimensions (e.g., a diameter) of the piston 150 to accommodate fluid and movement of the piston 150. The inner bore 140 may include a sealed annular cavity or hydraulic chamber 142 defined between an upper axial end of the piston 150, an inner axial surface of the inner bore 140, and the inner radial surface 141 of the inner bore 140. The first and second fittings 132 and 134 and the bleeder 136 may be configured to be in fluid communication with the hydraulic chamber 142.

The piston 150 may include the piston saddle 152 and a piston rod 154. The bottom surface 153 of the piston saddle 152 may define a distal end of the piston 150. The bottom surface 153 may be provided at an axial end of the piston saddle 152. The piston saddle 152 may be constructed of a solid piece of material. The piston saddle 152 may be coupled (e.g., threaded, bolted, welded, fused, etc.) to a bottom of the piston rod 154. For example, a saddle securing bolt 170 may couple the piston saddle 152 to the piston rod 154. The saddle securing bolt 170 may be inserted through and/or engaged with an upper portion of the piston saddle 152 and a lower portion of the piston rod 154. The saddle 152 may include an inner bore or hole for the saddle securing bolt 170, and the saddle securing bolt 170 may be tightened or loosened with a tool (e.g., screwdriver) inserted into the inner bore. Alternatively, the piston rod 154 and the piston saddle 152 may be formed integrally to form a single, one-piece unitary piston 150 formed from a single piece of material.

The tool hole 159 may extend through the piston saddle 152. The tool hole 159 may be provided at a height below a bottom of the saddle securing bolt 170 so as not to interfere with the saddle securing bolt 170. The tool hole 159 may align with the inner bore or recess of the piston saddle 152 through which the saddle securing bolt 170 is inserted. Alternatively, a bottom of the saddle securing bolt 170 may include a hole that aligns with the tool hole 159.

The saddle securing bolt 170 may be coupled to allow rotation of the piston saddle 152 with respect to the piston rod 154 such that, during rotation, the piston saddle 152 rotates independently from the piston rod 154. A portion of the saddle securing bolt 170 engaged with the piston rod 154 may have threading, and another portion of the saddle securing bolt 170 engaged with the piston saddle 152 may not have threading to facilitate rotation of the piston saddle 152 with respect to the piston rod 154. As shown more clearly in FIG. 4, the saddle securing bolt 170 may be coupled at a position which is laterally offset from a center of saddle 152, so as to allow different bearing load areas. The saddle securing bolt 170 may serve as an eccentric shaft of rotation, and a rotation of the piston saddle 152 may be similar to that of an eccentric cam. A transverse cross-sectional area of the piston saddle 152 may have an oval shape as shown in dashed lines in FIG. 6, which indicates a shape of the bottom surface 153.

The piston rod 154 may be at least partially disposed inside the inner bore 140. The piston rod 154 may be axially moveable in relation to the inner bore 140. In a first position of the piston 150 (FIG. 4), a majority of the piston rod 154 may be disposed within the inner bore 140. Alternatively, the piston rod 154 may be configured to be disposed entirely within the inner bore 140 when the piston is in the first position. In a second position of the piston 150, the piston rod 154 may extend further outside the inner bore 140 to be exposed to an outside of the body 110. The first position of the piston 150 may be referred to as a retracted position. The second position of the piston 150 may be referred to as an extended position or a protracted position.

The piston rod 154 may include an upper portion 151, which may be wider than a remaining portion of the piston rod 154. Inner dimensions of the inner bore 140 may be configured to correspond to outer dimensions of the upper portion 151 of the piston rod 154. A transverse cross-sectional area of the upper portion 151 may have a circular shape and the inner bore 140 may be cylindrical, but aspects disclosed herein are not limited. A vertical length of the upper portion 151 of the piston rod 154 may define a piston stroke of the piston 150.

An outer surface of the upper portion 151 of the piston rod 154 may include a piston seal or gasket 156 and a piston wear ring 158. The piston seal 156 may be provided in a recess of the upper portion 151 of the piston rod 154 and assist in maintaining a sealed state of the hydraulic chamber 142. The piston wear ring 158 may be provided in a recess of the upper portion 151 of the piston rod 154 at a position below the piston seal 156. The piston wear ring 158 may help maintain a position of the piston rod 154 and distribute even pressure on the piston rod 154 to reduce wear on the piston rod 154.

A top of the piston rod 154 may be positioned lower than a height of the bleeder 136. However, aspects disclosed herein are not limited to positions of the first fitting 132, the second fitting 134, the bleeder 136, and the hydraulic chamber 142 and/or the piston seal 156.

A stop ring or retainer 160 may surround a portion of the piston rod 154 under the upper portion 151, and a wiper seal 196 may be provided in a recess of the stop ring 160 to surround the piston rod 154. The stop ring 160 may be coupled (e.g., threaded) to an inner surface of the piston housing 116. The stop ring 160 may be provided in a lower recess of the piston housing 116 outside of the inner bore 140. The stop ring 160 may help to limit a movement of the piston 150.

The piston rod 154 may further include an inner bore that receives at least a portion of the spring assembly 180. A shape or inner contour of the inner bore of the piston rod 154 may correspond to an outer shape or outer contour of the spring assembly 180. The spring assembly 180 may elastically couple the piston rod 154 to the flange 111 and/or extension 118 of the body 110 at a side opposite to a side coupled to the piston saddle 152. The spring assembly 180 may include a spring 182, a first or upper spring retainer 184, and a second or lower spring retainer 186.

The spring 182 may be a coil spring or extension spring. The spring 182 may be coupled (e.g., engaged, pressed-fit, adhered, etc.) to the first and second spring retainers 184 and 186.

The first spring retainer 184 may at least partially extend through and securely couple to a first or upper end of the spring 182. The first spring retainer 184 may be coupled to the flange 111 and/or extension 118 via a first or upper socket head screw 188. An upper end of the first spring retainer 184 may be formed with a recess or through hole having inner threads, and the first socket head screw 188 may have outer threads to engage with the inner threads of the first spring retainer 184. An upper end of the extension 118 may include a through hole aligning with the through hole of the first spring retainer 184 and may also be formed with inner threads configured to engage with outer threads of the first socket head screw 188. The through hole of the extension 118 may be shaped to correspond to an outer contour of the first socket head screw 188 and include a stepped portion configured to support a head of the first socket head screw 188. A first or upper washer gasket 192 may be provided at the stepped portion. A top end of the first socket head screw 188 may be flush with an upper surface of the extension 118 at the proximal end 122 of the body 110.

The second spring retainer 186 may at least partially extend through and securely couple a second or lower end of the spring 182. The second spring retainer 186 may be coupled to the piston housing 116 via a second or lower socket head screw 190. A lower end of the second spring retainer 186 may be formed with a recess or through hole having inner threads, and the second socket head screw 190 may have outer threads to engage with the inner threads of the second spring retainer 186. A lower end of the second socket head screw 190 may protrude into a secondary inner bore of the piston rod 154 formed in a distal end of the piston rod 154. At least a portion of the lower end of the second socket head screw 190 may be disposed in the secondary inner bore between the piston rod 154 and the piston saddle 152. The saddle securing bolt 170 may also extend into the secondary inner bore below the second socket head screw 190.

The piston rod 154 may include a through hole aligning with the through hole of the second spring retainer 186 and may be formed with inner threads configured to engage with outer threads of the second socket head screw 190. The through hole of the piston rod 154 may be shaped to correspond to an outer contour of the second socket head screw 190 and include a stepped portion configured to support a head of the second socket head screw 190. A second or lower washer gasket 194 may be provided at the stepped portion. The first and second washer gaskets 192 and 194 may be made of a metal (e.g., copper), but aspects disclosed herein are not limited.

FIG. 6 illustrates a top view of the tensioner 100 of FIG. 2. As previously described, the continuous side surface 126 of the body 110 may include the rear portion 128 and the front portion 130 opposite the first portion 128.

The rear portion 128 may have a concave section having a concave curvature with respect to central axis 600. The concave curvature of the concave section of the rear portion 128 may correspond to structures or pipes which are intended to be coupled, such as a curvature along the first and second pipe flanges 222 and 224 and/or around the first and second pipes 212 and 214 (FIG. 1). The rear portion 128 may alternatively be referred to as an inner surface portion. An entirety of the rear portion 128 may not be concave. For example, the rear portion 128 may include straight or angled edges (or convex sections) near the first and second fastener holes 144 and 146.

The front portion 130 may be curved or angled to connect to the rear portion 128. For example, the front portion 130 may have a semicircular curvature. From a front side of the body 110, a curvature of the front portion 130 may appear convex with respect to central axis 600, and the front portion 130 may alternatively be referred to as an outer surface portion. The front and rear portions 128 and 130 are not limited to the shown shapes and curvatures, and the front and rear portions 128 and 130 may have shapes and/or curvatures configured for different applications or coupling elements.

The center axes 145, 147 (FIG. 3) of the first and second fastener holes 144 and 146 may be closer to the rear portion 128 than the front portion 130. The centers 145, 147 of the first and second fastener holes 144 and 146 may be between the central axis 600 of the piston housing 116 and the rear portion 128. The centers 145, 147 (FIG. 3) of the first and second fastener holes 144 and 146 may be intersected by 601 and 603, respectively, from the central axis 600 of the piston housing 116, and the first and second fastener holes 144 and 146 may be symmetrical with respect to line 4-4.

Positions of the first and second fastener holes 144 and 146 may be configured based on positions of the fastener holes of the first and second pipe flanges 222 and 224 (FIG. 1). A distance between the first and second fastener holes 144 and 146 may correspond to a distance between the fastener holes of the first and second pipe flanges 222 and 224. With respect to a radial direction of the piston housing 116, the centers 145, 147 (FIG. 3) of the first and second fastener holes 144 and 146 may have radial positions which are spaced apart by an angle θ, which may be in a range of 80 to 100 degrees or 85 to 95 degrees (e.g., 90 degrees or 92 degrees), but aspects disclosed herein are not limited to a spacing of the fastener holes 144 and 146. Line 4-4 may be perpendicular to line 5-5, and lines 601 and 603 may intersect an angle between lines 4-4 and 5-5. When the fastener holes 144 and 146 are spaced apart by 90 degrees, lines 601 and 603 may bisect the angle between lines 4-4 and 5-5 so as to extend at an angle of 45 degrees extend with respect to line 4-4 and with respect to line 5-5.

Inner diameters of the first and second fastener holes 144 and 146 may correspond to an outer diameter of the stud assemblies 300 (FIG. 1) (e.g., outer diameters of the tensioner stud 330) and/or inner diameters of the fastener holes of the first and second pipe flanges 222 and 224. A diameter and transverse cross-sectional area of the piston 150 (i.e., diameters of both the piston rod 154 and the piston saddle 152) may be larger than diameters and transverse cross-sectional areas, respectively, of each of the first and second fastener holes 144 and 146. In addition, as explained later, the diameter and transverse cross-sectional area of the piston 150 may be larger than diameters and transverse cross-sectional areas of the fastener holes of the first and second pipe flanges 222 and 224.

An interior of the body 110 may include a pair of fluid channel or passages 198 and 199 in fluid communication with the hydraulic chamber 142 (FIG. 5) and the pair of hydraulic fittings 132 and 134, respectively. The pair of fluid channels 198 and 199 may extend through the flange 111. The pair of fluid channels 198 and 199 may be symmetrical across line 4-4. The pair of fluid channels 198 and 199 may not align, in a radial direction, with the central axis 600. The pair of fluid channels 198 may be oriented at an angle in a range of 20 to 60 degrees (e.g., 30 degrees or 45 degrees) with respect to line 4-4. The first and second fittings 132 and 134 may be in fluid communication with the pair of fluid channels 198 and 199, respectively. The first and second fittings 132 and 134 may have radial positions, with respect to lien 4-4, that correspond to radial positions of outer ends of the pair of fluid channels 198 and 199. An angle and arc length between the first and second fittings 132 and 134 may be less than the angle θ and the arc length between the first and second fastener holes 144 and 146.

The tensioner 100 may be sized based on a size of the first and second pipe flanges 222 and 224. For example, the tensioner 100 may be configured to be installed on a 12-bolt flange connection or 16-bolt flange connection, but aspects disclosed herein are not limited.

Figure 7:
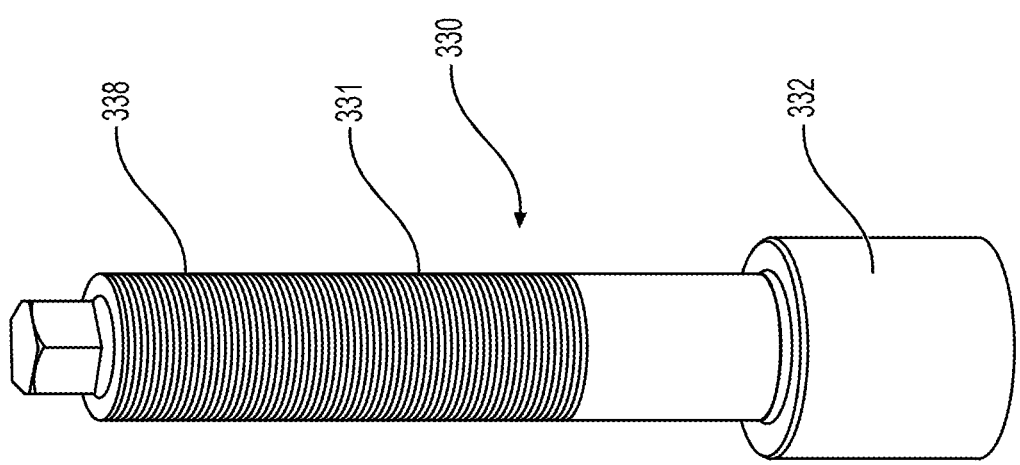
FIG. 7 is a front view of the tensioner stud shown in FIG. 2.
Figure 8:
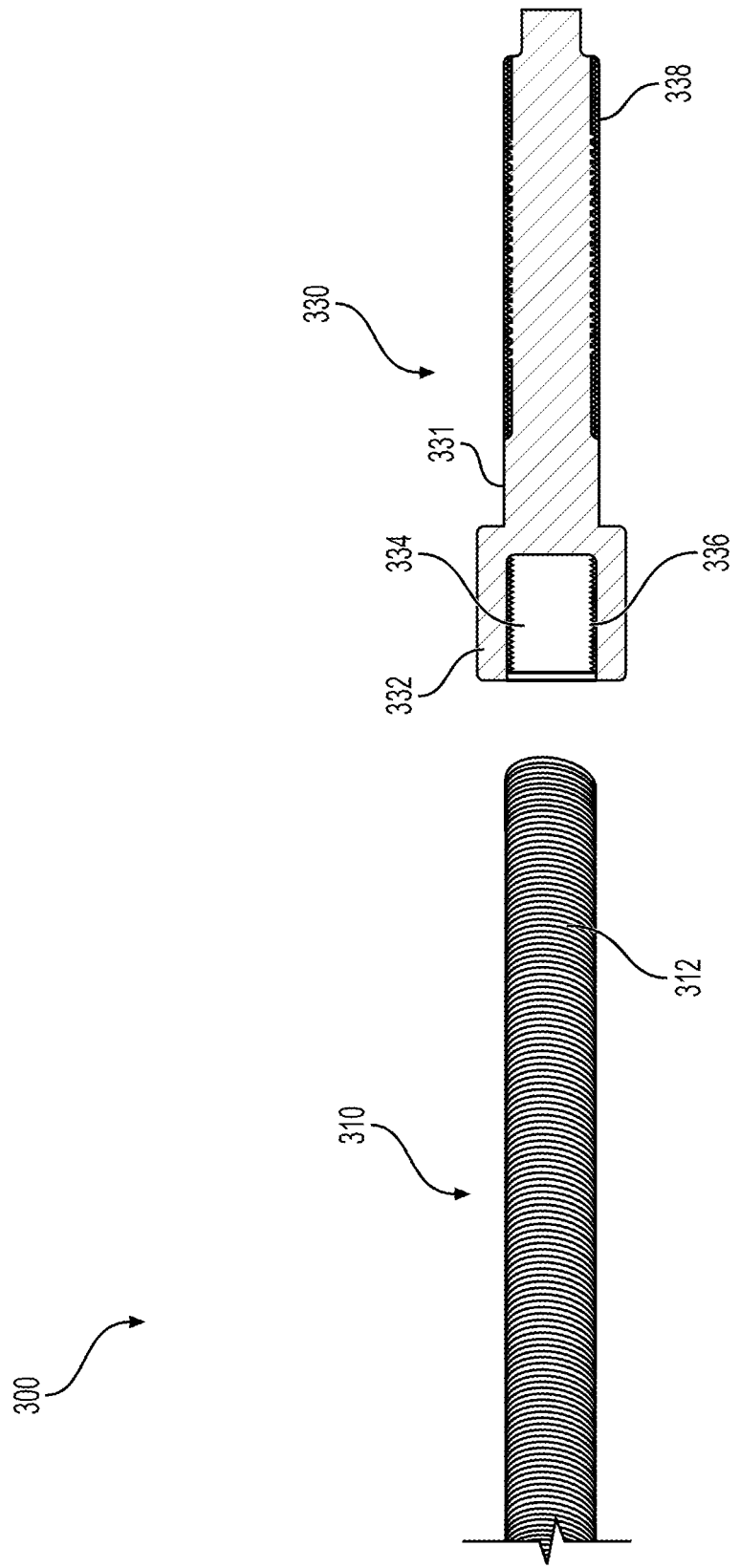
FIG. 8 is a view of the tensioner stud and stud shown in FIG. 2.

FIG. 7 shows a tensioner stud 330 of the stud assembly 300, and FIG. 8 shows an uncoupled stud assembly 300. Referring to FIGS. 1 and 7-8, as previously described, the stud assembly 300 may include the stud 310 and the tensioner stud 330. The stud 310 may include external threading 312 configured to couple to the middle and lower nuts 420 and 430. A length of the stud 310 may be sufficient for passage through the first and second pipe flanges 222 and 224, but may be insufficient for passage through the tensioner 100.

The tensioner stud 330 may include a body 331 and a base 332. The body 331 may include external threading 338 configured to couple to the upper nuts 410. The external threading 338 may cover a portion of the body 331, but aspects disclosed herein are not limiting to a threading arrangement. The base 332 may include an inner space or recess 334 including internal threading 336 configured to engage with external threading 312 of the stud 310. The base 332 may have a larger diameter than the body 331, but aspects disclosed herein are not limited. The body 331 may be configured to be inserted into the first and second fastener holes 144, 146 of the tensioner 100. The first and second fastener holes 144, 146 may be configured to allow a variety of sizes and types of tensioner studs 330, or may alternatively be configured based on a specific type of tensioner stud 330. The body 331 may have a same or similar diameter to the stud 310. The stud 310 may be coupled to the tensioner stud 330 so that the stud assembly 300 has a length sufficient to pass through the first and second pipe flanges 222 and 224 and also the tensioner 100. A diameter of the inner space 334 may be configured based on a diameter of a type of stud 310 used.

Figure 9:
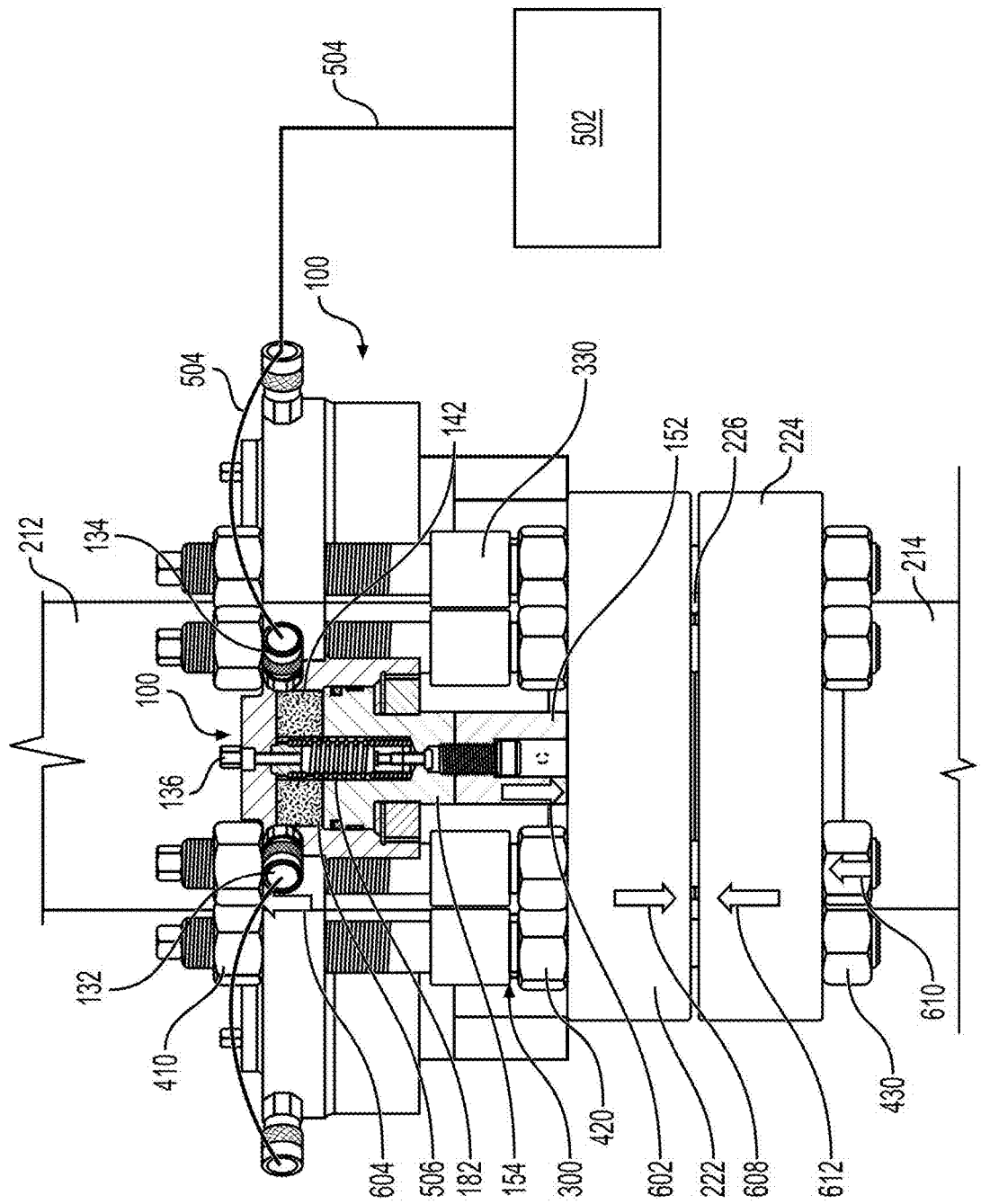
FIG. 9 is a front view of the pipe system of FIG. 1 showing an internal cross-section of a tensioner.

FIG. 9 shows three tensioners 100 of the coupling system 10 positioned around pipe system 200. As noted above, the tensioners 100 may be installed via a plurality of stud assemblies 300 and a plurality of nuts 410, 420, and 430. The pipe system 200 may include a gasket or seal 226 (e.g., O-ring gasket) provided between the first and second pipe flanges 222 and 224. The gasket or seal 226 may be made of, for example, a metal, a resilient material such as rubber or plastic, etc.

As noted above, the plurality of stud assemblies 300 may include a pair of stud assemblies 300, each pair of stud assemblies 300 corresponding to one tensioner 100. The pair of stud assemblies 300 may be extended through the pair of fastener holes 144 and 146, respectively, of the tensioner 100. The stud assemblies 300 may be provided at positions that that do not interfere with a movement of the piston 150, and the piston 150 may be provided between stud assemblies 300 in a pair of stud assemblies 300. The stud assemblies 300 may also be extended through fastener holes of the first and second pipe flanges 222 and 224. At least a portion of the studs 310 and tensioner studs 330 may have threads (see FIGS. 2 and 6-7) configured to engage with the plurality of nuts 410, 420, and 430.

The plurality of nuts 410, 420, and 430 may secure the plurality of stud assemblies 300 and the tensioner 100 to the first and second pipe flanges 222 and 224. The plurality of nuts 410, 420, and 430 may include a first or upper nut 410, a second or middle nut 420, and a third or lower nut 430. The middle nut 420 may alternatively be referred to as the first nut, and the upper nut 410 may alternatively be referred to as the second nut. The upper, middle, and lower nuts 410, 420, and 430 may be standard hexagonal nuts (hex nuts) and may have internal threading configured to grip the studs 300. The upper, middle, and lower nuts 410, 420, and 430 and the studs 300 may be made of a metal (e.g., stainless steel), but aspects disclosed herein are not limited.

A lower nut 430 may be inserted onto a first stud 310 of a first stud assembly 300, and the first stud 310 may be inserted through the first and second pipe flanges 222 and 224. A lower nut 430 may be inserted onto a second stud 320 (FIG. 2) of a second stud assembly 300, and the second stud 310 may be inserted through the first and second pipe flanges 222 and 224. The lower nuts 430 may remain below the first and second pipe flanges 222 and 224 to be positioned at a lower side of the second pipe flange 224 (FIG. 1). As an alternative to inserting lower nuts 430, distal ends of the first and second studs 310 and 320 may include a fastener (e.g., a bolt head). A pair of middle nuts 420 may be inserted onto the first and second studs 310 and 320, respectively, to be above the first and second pipe flanges 222 and 224. The tensioner 100 may be placed on the first and second studs 310 and 320 above the middle nuts 420. The middle nuts 420 may be positioned at a second or lower side of the body 110 to be under the tensioner stud 330 and the flange 111. The middle nuts 420 may be positioned above the first and second pipe flanges 222 and 224 to be provided at an upper side of the first pipe flange 222 (FIG. 1). A pair of upper nuts 410 may be placed on the first and second studs 310 and 320, respectively, to be provided above the tensioner 100. The upper nuts 410 may be provided at a first or upper side (or a proximal end surface) of the body 110 toward first or upper ends of the first and second studs 310 and 320.

FIG. 9 shows forces during a tightening operation of the tensioner 100. Prior to actuation of the tensioner 100, at least the upper and lower nuts 410 and 430 may be tightened to be flush with the surfaces they are contacting. The fastener holes of the first pipe flange 222 and the fastener holes of the second pipe flange 224 may be respectively aligned in a vertical or axial direction of the first and second pipes 212 and 224, while the first and second fastener holes 144 and 146 (FIG. 5) of the tensioner 100 may be aligned with at least some of the fastener holes of the first and second pipe flanges 222 and 224. The stud assemblies 300 may extend through aligned fastener holes of the first and second pipe flanges 222 and 224, along with the first and second fastener holes 144 and 146 of the tensioner 100. Before tensioning, the first and second pipe flanges 222 and 224 may be spaced apart by a first axial spacing, and the gasket 226 may be provided in the first axial spacing.

When the pump 502 (FIG. 1) is actuated, hydraulic fluid (e.g., oil) 506 may be supplied through the first fitting 132 to the hydraulic chamber 142 of the flange 111 via the hydraulic tubing 504 and a fluid channel or passage 198. The hydraulic tubing 504 may be in fluid communication and aligned with the fluid channel 198, which may be in fluid communication with the hydraulic chamber 142. As hydraulic fluid 506 fills the hydraulic chamber 142, air and/or gas may be exhausted through the bleeder 136.

The plurality of hydraulic stud tensioners 100 may be connected in series via the hydraulic tubing 504, and the hydraulic fluid 506 may be supplied to all of the hydraulic chambers 142 of the plurality of hydraulic stud tensioners 100. Although hydraulic pressure will initially be uneven among all of the plurality of hydraulic stud tensioners 100, eventually, the hydraulic pressure may even out as hydraulic fluid 506 is supplied to all of the hydraulic chambers 142 of the piston housings 116 of each tensioner 100 via the first and second fittings 132 and 134 and the hydraulic tubing 504. Hydraulic fluid 506 may, for example, enter through first fitting 132 and exit through the second fitting 134 via fluid channel 199.

As more hydraulic fluid 506 is supplied to the hydraulic chamber 142, the hydraulic fluid 506 may create a hydraulic pressure which acts on a proximal or top side of the piston rod 154, pushing the entire piston 150 (i.e., the piston rod 154 and the piston saddle 152) downward to extend out of the piston housing 116 and toward the first pipe flange 222. This hydraulic force is exemplified by the downward direction of arrow 602. As the piston 150 is extended downward, the spring 182 may be in tension and expanded.

Eventually, the hydraulic force will cause the piston 150 to apply a downward force, on the first pipe flange 222, as indicated by arrow 602. The piston 150 may be aligned axially with a fastener hole of the first pipe flange 222. The piston saddle 152 may have a diameter which is greater than a diameter of the fastener holes in the first and second pipe flanges 222 and 224 such that the piston saddle 152 may contact the first pipe flange 222 at an area which is radially outside of the fastener hole of the first pipe flange 222. The pistons 150 of each tensioner 100 may press down together on the first pipe flange 222 to apply an even downward force on the first pipe flange 222 (arrow 604).

As a downward force is exerted on the piston 150, an upward force is exerted on the body 110 against the upper nuts 410, which may urge the flange 111 upward against the upper nuts 410 at the first and second sides 112 and 114, indicated by arrow 604. The bodies 110 of each tensioner 100 together may press upward against the upper nuts 410. The upper nuts 410 may serve as a leverage point for hydraulic pressure to exert the downward force on the piston 150 and for the piston 150 to exert a downward force on the first pipe flange 222 (arrow 602).

As the body 110 is moved upward against the upper nuts 410, the stud assemblies 300 may be tensioned. As the stud assemblies 300 are tensioned and as the piston 150 exerts a downward force on the first pipe flange 222, a distance between the first pipe flange 222 and the middle nuts 420 may increase. In this way, the hydraulic force of the tensioner 100 may move the piston 150 in a direction opposite to a direction in which the upper nuts 410 are urged, in which the stud assemblies 300 are tensioned, and in which the second pipe flange 224 may be moved.

The first pipe flange 222 may exert a downward force on the gasket 226 provided between the first and second pipe flanges 222 and 224, as indicated by arrow 608. In addition, as the stud assemblies 300 are tensioned, the lower nuts 430 may exert an upward force on the second pipe flange 224, as indicated by arrow 610, which may cause the second pipe flange 222 to exert an upward force on the gasket 226, as indicated by arrow 612. The gasket 226 may be compressed or crushed between the first and second pipe flanges 222 and 224 as an axial spacing between the first and second pipe flanges 222 and 224 is decreased from the first axial spacing to a second axial spacing which is closer or shorter than the first axial spacing.

Once the gasket 226 is compressed, the middle nuts 420 may be tightened downward against the first pipe flange 222 to maintain a compressed state of the gasket 226 and to maintain the second axial spacing. Because the middle nuts 420 are exposed and not within the body 110, the middle nuts 420 may be tightened with an open-faced hand wrench.

Once the middle nuts 420 are sufficiently tightened or positioned (based on the clamping of the flanges 222, 224 provided by tensioners 100), the hydraulic pressure may be released via a release valve of the pump 502. Releasing the hydraulic pressure in tensioners 100 will allow the springs 182 to urge the pistons 150 back inside the inner bore 140 in the distal direction via an elastic restoring force. Then, the upper nuts 410 may be removed, along with the tensioner 100.

Figure 10:
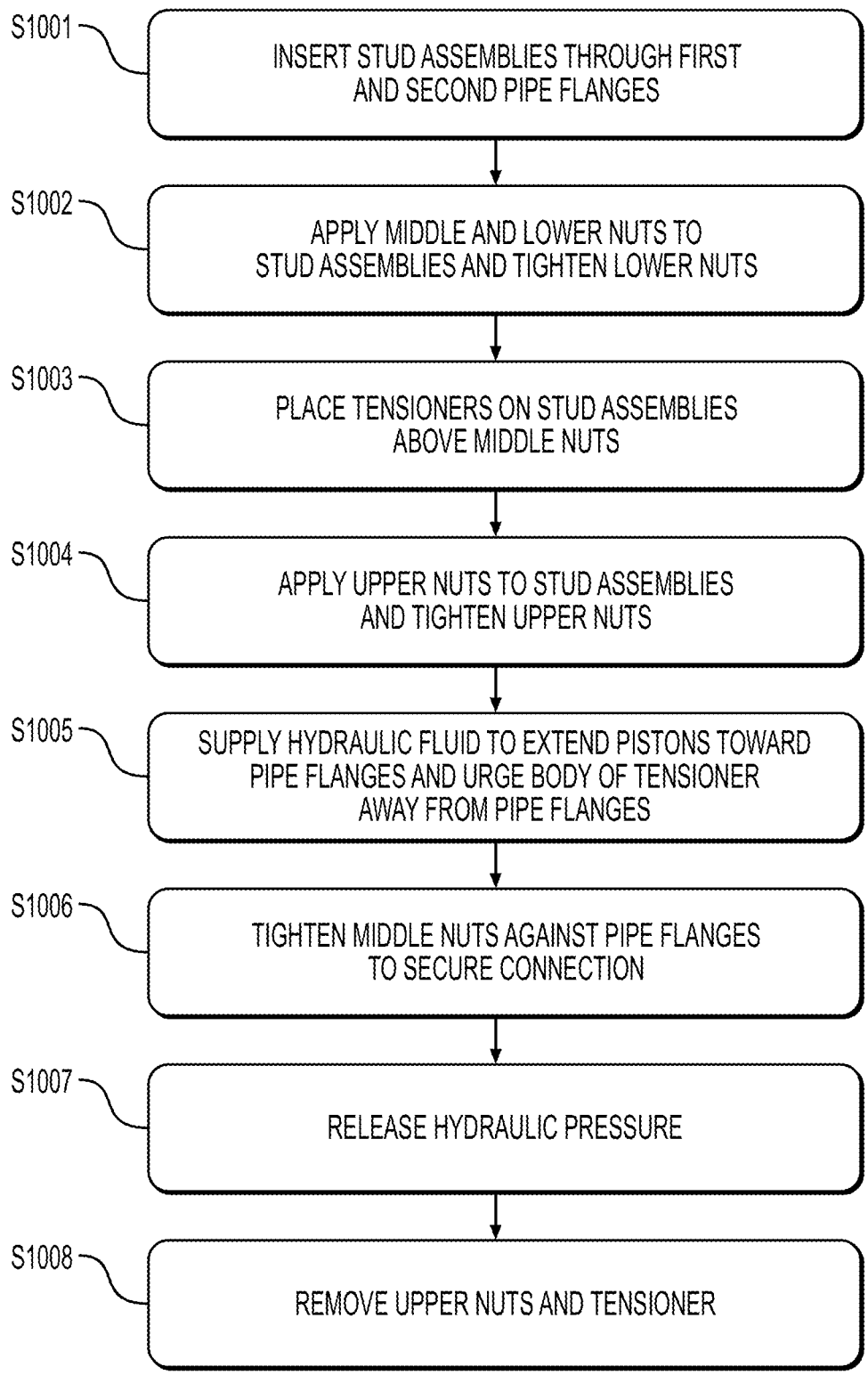
FIG. 10 provides a flowchart depicting an exemplary method for operating the system of FIGS. 1-9.

FIG. 10 illustrates the above described method for tensioning studs to couple two flanges. For convenience of description, an example where the stud assemblies 300 include tensioner studs 330 and studs 310, 320 will be described, but aspects disclosed herein are not limited to a configuration of the stud assemblies 300. Referring to FIGS. 1-10, in step S1001, to prepare the first and second pipe flanges 222 and 224 for tightening, a plurality of pairs of studs 310, 320 may be inserted through a plurality of fastener holes of the first and second pipe flanges 222 and 224. Each pair of studs 310, 320 may include a first stud 310 and a second stud 320. Before insertion of the first and second studs 310, 320, the gasket 226 may be inserted between the first and second pipe flanges 222 and 224.

Not every fastener hole of the first and second pipe flanges 222 and 224 may have a stud 310, 320 inserted therethrough. For example, where the first and second pipe flanges 222 and 224 are 12-bolt flanges, four pairs of studs 310 and 320 (for a total of eight) may be used. The first and second studs 310, 320 may be arranged in the first and second pipe flanges 222 and 224 to have an empty fastener hole between the first and second studs 310 and 320. The empty fastener holes of the first and second pipe flanges 222 and 224 may be aligned with each other in an axial direction and may be configured to ultimately align with the piston 150 of the tensioner 100. The second stud 320 of one pair of studs 300 may be inserted into a fastener hole which is adjacent to a fastener hole in which a first stud 310 of an adjacent pair of studs 300 is inserted.

Once the pairs of studs 310, 320 have been inserted through the first and second pipe flanges 222 and 224, in step S1002, middle and lower nuts 420 and 430 may be threaded onto the studs 300. The lower nuts 430 may be tightened against the first second pipe flange 224 and fixed to distal ends of the studs 300, while the middle nuts 420 may be left to rotate freely and/or the middle nuts 420 may be hand-tightened or loosely tightened. The first and second pipe flanges 222 and 224 may be positioned between the middle and lower nuts 420 and 430. The lower nut 420 may be tightened using an open-faced hand wrench, but embodiments disclosed herein are not limited. The tensioner studs 330 may be coupled to the first and second studs 310 and 320 after placing the middle nuts 420.

In step S1003, to install the tensioner 100, at least one tensioner 100 may be placed on two or more tensioner studs 330 above the middle nuts 420. When tensioner studs 330 are omitted, the at least one tensioner 100 may be placed on two or more studs 310, 320 above the middle nuts 420. At this step, a plurality of hydraulic stud tensioners 100 may be provided on the plurality of stud assemblies 300. For example, when using 12-bolt flanges, four hydraulic stud tensioners 100 may be applied to eight stud assemblies 300 arranged on the first and second pipe flanges 222 and 224. Each tensioner 100 may be applied to a pair of stud assemblies 300, where each pair has the first and second studs 310 and 320.

The first and second fastener holes 144 and 146 of each tensioner 100 may be inserted onto the pair of stud assemblies 300, respectively, to be aligned with the fastener holes of the first and second pipe flanges 222 and 224. The tensioners 100 may be configured based on a size of the first and second pipe flanges 222 and 224. In addition, at least some aspects of the stud tensioners 100 (e.g., the first and second fastener holes 144 and 146) may be configured based on sizes of the stud assemblies 300. Step S1003 may also be performed on a previously tightened pair of first and second pipe flanges 222 and 224. For example, tensioner studs 330 may be coupled to previously tensioned studs 310, 320 above middle nuts 420, and the tensioner 100 may be placed on the tensioner studs 330. Steps S1004 through S1008 may be performed to further tighten and compress the gasket 226 between the first and second pipe flanges 222 and 224.

In step S1004, upper nuts 410 may be placed on the studs 300 above the first and second sides 112 and 114 of the tensioner 100. The upper nuts 410 may be tightened against the proximal end surface of the body 110 at the first and second sides 112 and 114 and fixed to proximal ends of the studs 300. The upper nuts 410 may be tightened using an open-faced hand wrench, but embodiments disclosed herein are not limited.

In step S1003, step S1004, or before step S1005, hydraulic tubing 504 may be connected to the first fitting 132. When a plurality of tensioners 100 are used, the plurality of tensioners 100 may be connected in series by connecting hydraulic tubing 504 between a second fitting 134 of a first tensioner 100 and a first fitting 134 of an adjacent second tensioner 100. As an alternative, each tensioner 100 may be connected to its own pump 502 and/or hydraulic fluid supply system 500, and the pumps 502 and/or hydraulic fluid supply systems 500 may be connected in series via hydraulic tubing 504.

In step S1005, hydraulic fluid 506 may be supplied to the tensioner 100 via the hydraulic tubing 504 and the first fitting 132. As previously described, when a plurality of tensioners 100 are used, hydraulic fluid 506 may enter all of the hydraulic chambers 142 of the hydraulic stud tensioners 100 via the first and second fittings 132 and 134 to apply a generally uniform compressive force on flanges 222, 224. The hydraulic pressure may urge the pistons 150 downward toward and ultimately against the first pipe flange 222. Where the piston 150 may axially align with empty fastener holes in the first and second pipe flanges 222 and 224, the piston 150 may be pressed against the first pipe flange 222 at an area radially outside of the empty fastener hole in the first pipe flange 222. As the pistons 150 are forced downward, the first and second sides 112 and 114 of the flange 111 of the tensioner 100 may be forced upward, pulling the upper nuts 410 and studs 300 upward. The gasket 226 may be compressed between the first pipe flange 222 and the second pipe flange 224.

The hydraulic pressure may be increased by controlling the pump 502. As an example, the pump 502 may be controlled to apply a pressure to provide a required force to complete a coupling of the first and second pipe flanges 222 and 224. For example, the pump 502 may be controlled to apply a pressure of 2300 pounds per square inch (psi) when three hydraulic stud tensioners 100 are used on six studs 300. As another example, the pump 502 may be controlled to apply a pressure of 3500 psi when two hydraulic stud tensioners 100 are used on four studs 300. A pressure gauge may indicate a pressure of the pump 502. The pump 502 may be configured to apply a predetermined pressure based on the materials and dimensions of the pipe system 200 and the tensioner 100. The pump 502 may be set to apply the predetermined pressure, and further monitoring may not be necessary, so other sensors may not be required. The predetermined pressure may be applied for a predetermined time period or until the pistons 150 have extended by a predetermined amount or piston stroke.

In step S1006, the middle nuts 420 may be tightened using an open-faced hand wrench against the first pipe flange 222 to secure a connection between the first and second pipe flanges 222 and 224 and to maintain a compression of the gasket 226.

In step S1007, hydraulic pressure may be released by removing hydraulic fluid 506 from the hydraulic chamber 142 via a pressure release at pump 502. The hydraulic fluid 506 may be urged by the return movement of pistons 150 via a spring 182 to enter the hydraulic tubing 504 and return to the pump 502. The spring 182 may pull the piston 150 back to an initial position such that the piston rod 154 may be inside the piston housing 116. The hydraulic tubing 504 may be removed from the first and/or second fittings 132 and/or 134 once the hydraulic pressure is released.

In step S1008, to remove the tensioner 100, the upper nuts 410 may be loosened via an open-faced wrench and removed. The tensioner 100 may be lifted off the tensioner studs 330, and the tensioner studs 330 may be removed from the first and second studs 310 and 320. The first and second studs 310 and 320 may remain. After the tensioner 100 is removed, the tensioner 100 may be ready for a next operation without any further manipulation. The tensioner 100 may also be further tightened by repeating the method starting at step S1003.

INDUSTRIAL APPLICABILITY

The disclosed aspects of the tensioner of the present disclosure may be used to tension fasteners (e.g., studs or bolts) in coupling two structures together and may also be used to move the two structures toward each other. For example, the tensioner may be used to urge studs running through pipe flanges and also to provide a force that compresses a gasket or seal between the two pipe flanges to seal a connection. The tensioner may be used to pre-tension two fasteners (e.g., bolts or studs) prior to coupling two structures together.

Aspects of the present disclosure may provide a tensioner that requires just one piston to pull two fasteners which are spaced apart in a direction perpendicular to a direction in which the fasteners are pulled (e.g., a lateral or circumferential direction). Aspects of the present disclosure may provide a tensioning method that does not require fasteners to be directly coupled to a piston, providing an easier and quicker installation process and a less complicated connection.

Aspects of the present disclosure may provide a tensioning method that uses a tensioner having a rotatable piston saddle to customize a bearing load area during tensioning. Aspects of the present disclosure may allow a larger piston to accommodate higher pressures and bearing loads. The tensioner disclosed herein may withstand a pressure of 7,500 psi or 15,000 psi. Aspects of the present disclosure may provide a tensioner stud which allows for use of shorter studs, bolts, or other fasteners in tensioning. Using shorter studs may provide a more compact coupling system once the tensioner and tensioner stud are removed, and there may not be excess stud length exposed in the coupling system.

Aspects of the present disclosure may provide a tensioning method that uses a small number of standard tools, such as tools already known to be compliant with American Petroleum Institute (API), American Society of Mechanical Engineers (ASME), American Society for Testing and Materials (ASTM International), and/or American National Standards Institute (ANSI) standards, to streamline a process and reduce manufacturing costs. Aspects of the present disclosure may provide a tensioner that uses readily available or standard size pistons to reduce manufacturing costs and that uses pistons having a solid bottom surface to apply a more even force on a structure to be tightened.

Aspects of the present disclosure may use less accessory parts and standard tooling, making repair and installation simpler and quicker, saving, for example, an hour of time connecting parts. Aspects of the present disclosure may provide a tensioning method which is safer by reducing a number of required connections and by providing standard pistons having a flat bottom surface. Aspects of the present disclosure may provide a tensioner which is sized according to a flange size rather than a fastener (e.g., stud or bolt) size, making identification of which tool to use easier. Aspects of the present disclosure may provide a tensioner with multiple seals to seal an inner bore of a piston housing, making a process of applying hydraulic pressure more effective. Aspects of the present disclosure may provide a quicker and less complicated tensioning method by allowing for hand and/or manual wrench tightening only. Aspects of the present disclosure may provide a quicker and more efficient tensioning method by reducing a number of fasteners (e.g., studs). Aspects of the present disclosure may tighten two coupling elements (e.g., plates or pipe flanges) using less studs than a number of stud holes provided in the coupling elements. Aspects of the present disclosure may provide a tensioner which can be reused for multiple tensioning processes.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A tensioner for assisting in coupling first and second pipe flanges, comprising:
 a body, including:
  a central longitudinal axis,
  a pair of fastener holes extending through the body in a direction parallel to the central longitudinal axis, and
  a piston housing having an inner bore disposed about the central longitudinal axis, the piston housing being provided between the pair of fastener holes, wherein an axial end of the piston housing defines a distal end of the body opposite to a proximal end of the body, and wherein the body includes a flange, and the fastener holes are formed in the flange at positions which are non-overlapping with the piston housing; and a piston at least partially disposed in the inner bore of the piston housing, the piston being axially moveable parallel to the central longitudinal axis through an opening of the inner bore at the distal end of the body, the piston comprising a piston rod and a piston saddle axially movable in a direction from the proximal end of the body toward the distal end of the body, the piston saddle disposed at the distal end of the body to contact the first pipe flange, and to push the first pipe flange that is in contact with the piston toward the second pipe flange.

2. The tensioner of claim 1, wherein the distal end of the body forms a distal planar surface, and the piston is extendable beyond the distal planar surface.

3. The tensioner of claim 1, wherein the body includes an extension, and a proximal end of the extension defines the proximal end of the body.

4. The tensioner of claim 1, wherein the flange is provided above the piston housing.

5. The tensioner of claim 1, wherein the flange includes a side surface including a first portion and a second portion, the second portion being opposite to the first portion, wherein the first portion includes a concave section with respect to the central longitudinal axis.

6. The tensioner of claim 5, wherein the second portion includes a convex section with respect to the central longitudinal axis.

7. The tensioner of claim 5, wherein centers of the fastener holes are between the first portion and the central longitudinal axis of the piston housing.

8. The tensioner of claim 1, wherein:
the body includes a side surface including a first portion connected to a second portion,
the second portion being opposite to the first portion, wherein the first portion includes a concave section having a concave curvature with respect to the central longitudinal axis; and
the second portion includes a pair of fittings configured to receive hydraulic fluid.

9. The tensioner of claim 1, wherein the body includes a hydraulic chamber, and a proximal end of the body includes a valve configured to exhaust at least one of air or gas from inside the hydraulic chamber.

10. The tensioner of claim 1, wherein the piston has a diameter larger than a diameter of at least one of the fastener holes.

11. The tensioner of claim 1, wherein the piston includes:
a piston rod having an inner bore; and
a spring provided in the inner bore to elastically couple the piston rod to the piston housing.

12. The tensioner of claim 1, wherein the piston includes a piston saddle coupled to a piston rod, an axial end of the piston saddle defining a distal end of the piston.

13. The tensioner of claim 12, wherein the piston saddle is configured to rotate.

14. The tensioner of claim 13, wherein the piston saddle has an axis of rotation that is off-set from a center of the piston saddle such that rotation of the piston saddle is eccentric.

15. A coupling system to couple first and second pipe flanges using a plurality of fasteners, comprising:

a plurality of tensioners, each tensioner including:
a body, including:
a proximal end, a distal end, and a central longitudinal axis extending from the proximal end to the distal end,
a pair of fastener holes extending through the body in a direction parallel to the central longitudinal axis, wherein the pair of fastener holes is configured to receive the plurality of fasteners which extends through holes in the first and second pipe flanges, and a piston housing provided between the pair of fastener holes; and
a piston at least partially located in the piston housing and extendable distally from the body, the piston comprising a piston saddle disposed at the distal end of the body, the piston saddle comprising a piston surface to contact the first pipe flange and push the first pipe flange toward the second pipe flange, thereby permitting coupling of the first and second pipe flanges to one another.

16. The coupling system of claim 15, wherein:
the plurality of fasteners includes a first stud assembly;
the body includes a flange having a first side and a second side, the first and second sides having the pair of fastener holes, respectively;
the first side of the flange is coupled to the first stud assembly between a first nut and a second nut;
the first stud assembly is coupled to the first and second pipe flanges between the second nut and a third nut;
the second nut is provided between the first and second pipe flanges and the flange;
the first nut is provided on a side of the flange opposite to a side facing the first and second pipe flanges; and
the first nut and the third nut are tightened to the first stud assembly.

17. The coupling system of claim 16, wherein the first stud assembly includes a stud and a tensioner stud configured to couple to the stud, wherein:
the first side of the flange is inserted onto the tensioner stud; and
the stud is coupled to the first and second pipe flanges between the second nut and the third nut.

18. A method of tensioning first and second pipe flanges with a plurality of tensioners, comprising:
inserting each tensioner of the plurality of tensioners onto at least two fasteners of a plurality of fasteners, wherein a first nut of each fastener is disposed between the first pipe flange and a corresponding tensioner;
coupling a second nut onto each fastener, each tensioner disposed between the first and second nuts of each corresponding fastener;
tightening the second nut of each fastener against a proximal end surface of each corresponding tensioner;
urging a piston of each tensioner against the first pipe flange to move the first and second pipe flanges from a first axial spacing to a second axial spacing relatively closer together than the first axial spacing;
tightening the first nut of each fastener against the first pipe flange to maintain the second axial spacing between the first and second pipe flanges; and
removing each tensioner from the corresponding fasteners while the first and second pipe flanges remain at the second axial spacing.

19. The method of claim 18, further comprising:
inserting a plurality of fasteners through the first and second pipe flanges; and coupling a third nut and the first nut onto each fastener of the plurality of fasteners, the first and second pipe flanges being disposed between the third and first nuts of each fastener;

wherein urging the piston of each tensioner comprises supplying hydraulic fluid to each tensioner to axially move the piston against the first pipe flange.

* * * * *